(12) United States Patent  (10) Patent No.: US 8,770,473 B2
Bufford et al.  (45) Date of Patent: Jul. 8, 2014

(54) SYSTEMS AND METHODS FOR PROVIDING FLEXIBLE INCENTIVE REWARDS

(75) Inventors: Joshua Bufford, Glen Allen, VA (US); Christine Landi, Glen Allen, VA (US); Jon Lintvet, Richmond, VA (US)

(73) Assignee: Capital One Financial Corporation, McLean, VA (US)

( * ) Notice: Subject to any disclaimer, the term of this patent is extended or adjusted under 35 U.S.C. 154(b) by 1613 days.

(21) Appl. No.: 11/377,668

(22) Filed: Mar. 17, 2006

(65) Prior Publication Data

US 2007/0094114 A1  Apr. 26, 2007

Related U.S. Application Data

(60) Provisional application No. 60/729,734, filed on Oct. 25, 2005.

(51) Int. Cl.
*G06Q 40/00* (2012.01)
*G07D 11/00* (2006.01)
*G07F 19/00* (2006.01)
*G06K 5/00* (2006.01)
*G06Q 30/00* (2012.01)

(52) U.S. Cl.
USPC ..... 235/379; 235/380; 705/14.27; 705/14.28; 705/14.3; 705/14.43

(58) Field of Classification Search
USPC ......... 235/379, 380; 705/14.25, 14.27, 14.28, 705/14.32, 14.33, 14.43
See application file for complete search history.

(56) References Cited

U.S. PATENT DOCUMENTS

| | | | | |
|---|---|---|---|---|
| 5,937,391 A | * | 8/1999 | Ikeda et al. | 705/14 |
| 6,018,718 A | * | 1/2000 | Walker et al. | 705/14 |
| 6,049,778 A | * | 4/2000 | Walker et al. | 705/14 |
| 6,195,644 B1 | * | 2/2001 | Bowie | 705/14 |
| 6,594,640 B1 | * | 7/2003 | Postrel | 705/14 |
| 6,820,061 B2 | | 11/2004 | Postrel | |
| 6,827,260 B2 | * | 12/2004 | Stoutenburg et al. | 235/380 |
| 6,850,901 B1 | | 2/2005 | Hunter et al. | |
| 6,885,994 B1 | | 4/2005 | Scroggie et al. | |
| 6,925,441 B1 | * | 8/2005 | Jones et al. | 705/10 |

(Continued)

FOREIGN PATENT DOCUMENTS

EP  1 182 599 A1  2/2002

OTHER PUBLICATIONS

BP Visa, Chase, http://www.firstusa.com/cgi-bin/webcgi/webserve.cgi?partner_dir_name=cac_bp&page=index , 2008.*

(Continued)

*Primary Examiner* — Daniel Walsh
(74) *Attorney, Agent, or Firm* — Finnegan, Henderson, Farabow, Garrett & Dunner, LLP

(57) ABSTRACT

Systems and methods are disclosed for providing a financial account with incentives. In one implementation, a method is provided that includes receiving a selection of at least one identified merchant from a customer, the customer being associated with the financial account. The method also includes providing a first incentive to the financial account for one or more purchases made with the financial account at a merchant other than the identified merchant. Further, the method may include providing a second incentive to the financial account for one or more purchases made at the identified merchant with the financial account, wherein the first incentive is different than the second incentive.

24 Claims, 4 Drawing Sheets

(56) References Cited

U.S. PATENT DOCUMENTS

| | | | |
|---|---|---|---|
| 7,124,109 B2* | 10/2006 | Sakamoto et al. | 705/37 |
| 7,219,071 B2* | 5/2007 | Gallagher | 705/14 |
| 7,430,521 B2* | 9/2008 | Walker et al. | 705/14 |
| 2001/0037241 A1* | 11/2001 | Puri | 705/14 |
| 2001/0054003 A1* | 12/2001 | Chien et al. | 705/14 |
| 2002/0013728 A1 | 1/2002 | Wilkman | |
| 2002/0046110 A1* | 4/2002 | Gallagher | 705/14 |
| 2002/0062279 A1* | 5/2002 | Behrenbrinker et al. | 705/39 |
| 2002/0069158 A1* | 6/2002 | Larkin et al. | 705/38 |
| 2002/0077895 A1* | 6/2002 | Howell | 705/14 |
| 2002/0082920 A1* | 6/2002 | Austin et al. | 705/14 |
| 2002/0107731 A1* | 8/2002 | Teng | 705/14 |
| 2002/0116329 A1* | 8/2002 | Serbetcioglu et al. | 705/39 |
| 2002/0129248 A1* | 9/2002 | Wheeler et al. | 713/170 |
| 2002/0138428 A1* | 9/2002 | Spear | 705/41 |
| 2002/0178056 A1* | 11/2002 | Lim | 705/14 |
| 2002/0188511 A1* | 12/2002 | Johnson et al. | 705/14 |
| 2003/0061097 A1* | 3/2003 | Walker et al. | 705/14 |
| 2003/0101131 A1* | 5/2003 | Warren et al. | 705/38 |
| 2003/0216997 A1* | 11/2003 | Cohen | 705/39 |
| 2004/0030808 A1* | 2/2004 | Okaue et al. | 710/3 |
| 2004/0193489 A1* | 9/2004 | Boyd et al. | 705/14 |
| 2004/0219971 A1* | 11/2004 | Ciancio et al. | 463/25 |
| 2005/0004839 A1* | 1/2005 | Bakker et al. | 705/14 |
| 2005/0021401 A1 | 1/2005 | Postrel | |
| 2005/0021405 A1* | 1/2005 | Agarwal | 705/14 |
| 2005/0071225 A1* | 3/2005 | Bortolin et al. | 705/14 |
| 2005/0096976 A1* | 5/2005 | Nelms | 705/14 |
| 2005/0234773 A1* | 10/2005 | Hirst et al. | 705/14 |
| 2005/0251440 A1* | 11/2005 | Bednarek | 705/10 |
| 2006/0173739 A1* | 8/2006 | Heywood | 705/14 |
| 2006/0218038 A1* | 9/2006 | Grider | 705/14 |
| 2006/0253320 A1* | 11/2006 | Heywood | 705/14 |
| 2006/0264257 A1* | 11/2006 | Jaffe et al. | 463/20 |
| 2007/0022009 A1* | 1/2007 | Cataldi et al. | 705/14 |
| 2007/0078719 A1* | 4/2007 | Schmitt et al. | 705/14 |
| 2007/0080212 A1* | 4/2007 | Rosenblatt et al. | 235/380 |
| 2007/0094114 A1* | 4/2007 | Bufford et al. | 705/35 |
| 2007/0118470 A1* | 5/2007 | Warren et al. | 705/38 |
| 2007/0136135 A1* | 6/2007 | Loeger et al. | 705/14 |
| 2007/0156530 A1* | 7/2007 | Schmitt et al. | 705/14 |
| 2007/0198354 A1* | 8/2007 | Senghore et al. | 705/14 |
| 2008/0059307 A1* | 3/2008 | Fordyce, III et al. | 705/14 |
| 2008/0065569 A1* | 3/2008 | Dutt et al. | 705/404 |
| 2008/0077514 A1* | 3/2008 | Hart | 705/35 |
| 2008/0097783 A1* | 4/2008 | Iannacci | 705/1 |
| 2008/0133350 A1* | 6/2008 | White et al. | 705/14 |
| 2008/0277465 A1* | 11/2008 | Pletz et al. | 235/379 |
| 2008/0319838 A1* | 12/2008 | Duroux et al. | 705/14 |
| 2009/0024484 A1* | 1/2009 | Walker et al. | 705/14 |
| 2009/0037275 A1* | 2/2009 | Pollio | 705/14 |
| 2009/0063333 A1* | 3/2009 | Nambiar et al. | 705/39 |
| 2009/0063351 A1* | 3/2009 | Schmeyer et al. | 705/64 |
| 2012/0078695 A1* | 3/2012 | Paterson | 705/14.15 |
| 2013/0226686 A1* | 8/2013 | Grossman | 705/14.27 |

OTHER PUBLICATIONS

CardRatings.com, Shell Mastercard from Citi, http://www.cardratings.com/credit/cardratings/index.php?fn=detail&id=267, 1998-2008.*

Cardratings.com, Gas Rebate Cards, www.cardratings.com/gasrebatecreditcard/html, 2004.*

CardRatings.com, Hess Rewards Visa Card, www.cardratings.com/credit/cardratings/index.php?fn=detail&id=203, 1998-2008.*

The Free Library, Hess, Chase offer New Credit Card with High Octane Rewards, (http://www.thefreelibrary.com/HESS%2c+Chase+Offer+New+Credit+Card+with+High+Octane+Rewards-a0123705098)., Oct. 28, 2004.*

PR Web, Gasoline Prices—Filing Up on the Card, www.prweb.com/releases/2004/07/prweb138458.htm, Jul. 5, 2004.*

Commonwealth Bank Group, Gold Commonwealth Awards, www.commbank.com.au/personal/credit-cards/gold-card/bonus-partner/default.aspx, 2008.*

ANZ Frequent Flyer Visa Card, www.anz.com/aus/promo/gantas500Opts/default.asp?sourcecode_1=IAFQ-IAFR, prior to Aug. 30, 2005.*

American Express Australia—Membership Rewards, http://web.archive.org/web/20050828173752/http://www.americanexpress.com/australia/personal/cards/rewards/bonuspoints.sht ml, Aug. 28, 2005.*

American Express and Costco Launch TrueEarnings, Sep. 1, 2004, http://qhome3.americanexpress.com/corp/pc/2004/trueearnings.asp.*

* cited by examiner

SYSTEMS AND METHODS FOR PROVIDING FLEXIBLE INCENTIVE REWARDS

CROSS REFERENCE TO RELATED APPLICATION

This application claims priority under 35 U.S.C. §119 to U.S. Provisional Application No. 60/729,734, filed Oct. 25, 2005, which is expressly incorporated herein by reference in its entirety.

TECHNICAL FIELD

The present invention generally relates to financial account products, including credit card products. More particularly, the invention relates to systems, methods, and computer program products for managing financial accounts with flexible reward incentives.

BACKGROUND

Credit card products have become so universally well known and ubiquitous that they have fundamentally changed the manner in which financial transactions and dealings are viewed and conducted in society today. Credit card products are most commonly represented by plastic card-like members that are offered and provided to customers through credit card issuers (such as banks and other financial institutions.) With a credit card, an authorized customer or cardholder is capable of purchasing services and/or merchandise without an immediate, direct exchange of cash. With each purchase, the cardholder incurs debt to their credit card account, which the cardholder may thereafter pay upon receipt of a periodic, for example, monthly statement. In most cases, the cardholder will have the option to either fully pay the outstanding balance or, as a matter of necessity or choice, defer at least a portion of the balance for later payment with accompanying interest or finance charges for the period during which payment of the outstanding debt is deferred (also referred to as a revolving charge credit line.)

In order to attract or retain customers, credit card issuers may offer credit card products that are associated with one or more incentives. These incentives may include points that are accumulated based on purchases made with these types of credit card products. A cardholder may use the accumulated points to receive goods and/or services provided by the credit card issuer and/or third party vendors. These incentives may also include a cash back incentive in which a certain percentage of the customers' purchases are returned to the customers in the form of cash, check, and/or credit on a credit card statement. For example, credit issuers may provide 1% cash back to the customers for all purchases made using the credit card products. Additionally, these incentives may provide a tiered incentive program that provides additional points or cash back for purchases made at vendors designated by or having established relationships with the credit card issuer. For instance, credit card issuers may offer credit card products associated with refueling stations for vehicles, such as a franchised gas station. When a cardholder makes purchases at a designated franchised gas station, the credit card issuer may credit the cardholder's account with a certain number of additional points or cash back, such as 5% of the total purchases.

Accordingly, such credit card products provide more points or incentives to the cardholder as the cardholder purchases more qualified goods or services. However, several drawbacks exist with these conventional approaches. For example, rewards cards provide tiered programs for points or incentives to participating customers, but only with vendors selected by the credit card issuer. In other words, customers can receive a higher number of points or other incentives, such as 5% cash back, only by making purchases at vendors that have been designated by or partnered with the credit card issuer. Many times, customers are not frequent shoppers at these pre-selected vendors and/or lose interest in the incentives and, thus, never fully realize the benefits. Further, customers may already have one or more preferred merchants or vendors for particular sets of goods and services and may not be interested in switching merchants.

Another problem that exists is that financial institutions have had difficulties in providing incentives or forging relationships with merchants in specific markets or smaller sized merchants or retailers, such as traditional "mom and pop" shops or specialty stores where fewer purchases are made by customers as a whole. The same is also true for other types of merchants or vendors, including on-line merchants and service providers, which have grown in popularity with customers but have not traditionally partnered or entered into relationships with financial institutions. These factors make it difficult for financial institutions, such as credit card issuers, to offer traditional incentives, including reward points for purchases made at these and other types of merchants and service providers. This leads to missed opportunities and lost benefits to individual customers who are frequent shoppers at these merchants.

In view of the foregoing, a need exists for improved systems and methods for providing incentives to customers, including incentives to attract or retain customers. There is also a need for such systems and methods that can be applied to a wider array of merchants, such as on-line merchants, local retailers, and specialty stores. Additionally, incentives are needed that do not require customers to make purchases only at merchants or vendors pre-selected by the financial institution to qualify or receive the full benefit of the promoted incentive or reward.

SUMMARY

Accordingly, embodiments consistent with the present invention relate to systems and methods for providing incentives to customers, including flexible incentive awards for financial products. Moreover, embodiments of the invention relate to systems and methods for providing financial accounts with an incentive program that can alleviate one or more of the above-described disadvantages existing in the related art.

Embodiments consistent with the invention include computer-implemented methods for providing a financial account with incentives. In one embodiment, a method is provided that includes receiving a selection of at least one identified merchant from a customer, the customer being associated with the financial account. The method also includes providing a first incentive to the financial account for one or more purchases made with the financial account at a merchant other than the identified merchant. Further, the method may include providing a second incentive to the financial account for one or more purchases made at the identified merchant with the financial account, wherein the first incentive is different than the second incentive.

In another embodiment, a method for providing a credit card account with incentives is provided that includes receiving a selection of an identified merchant from a customer, the customer being associated with the credit card account. The method further includes providing an incentive to the credit card account for purchases made at the identified merchant with the credit card account.

Embodiments consistent with the invention also include systems for providing a financial account with incentives. In one embodiment, a system is provided that comprises a financial account provider that provides a financial account for a customer and is configured to receive a selection of at least one identified merchant from a customer, the customer being associated with the financial account. The financial account provider may also provide a first incentive to the financial account for one or more purchases made with the financial account at a merchant other than the identified merchant. Further, the financial account provider may provide a second incentive to the financial account for one or more purchases made at the identified merchant with the financial account, wherein the first incentive is different than the second incentive.

Embodiments consistent with another aspect of the invention further relate to computer program products including instructions for execution by a processor to perform methods for providing a financial account with incentives. The method includes receiving a selection of at least one identified merchant from a customer, the customer being associated with the financial account. The method also includes providing a first incentive to the financial account for one or more purchases made with the financial account at a merchant other than the identified merchant. Further, the method may include providing a second incentive to the financial account for one or more purchases made at the identified merchant with the financial account, wherein the first incentive is different than the second incentive.

It is to be understood that both the foregoing general description and the following detailed description are exemplary and explanatory only, and should not be considered restrictive of the scope of the invention. Further, features and/or variations may be provided in addition to those set forth herein. For example, embodiments of the invention may be directed to various combinations and sub-combinations of the features described in the detailed description.

Additional aspects of the disclosed invention will be set forth in part in the description which follows, and in part will be obvious from the description, or may be learned by practice of the invention. The aspects of the invention may be realized and attained by means of the elements and combinations particularly pointed out in the appended claims.

BRIEF DESCRIPTION OF THE DRAWINGS

The accompanying drawings, which are incorporated in and constitute a part of this specification, illustrate embodiments consistent with the invention and together with the description, serve to explain the principles of the invention. In the drawings.

DETAILED DESCRIPTION OF THE EMBODIMENTS

Figure 1:
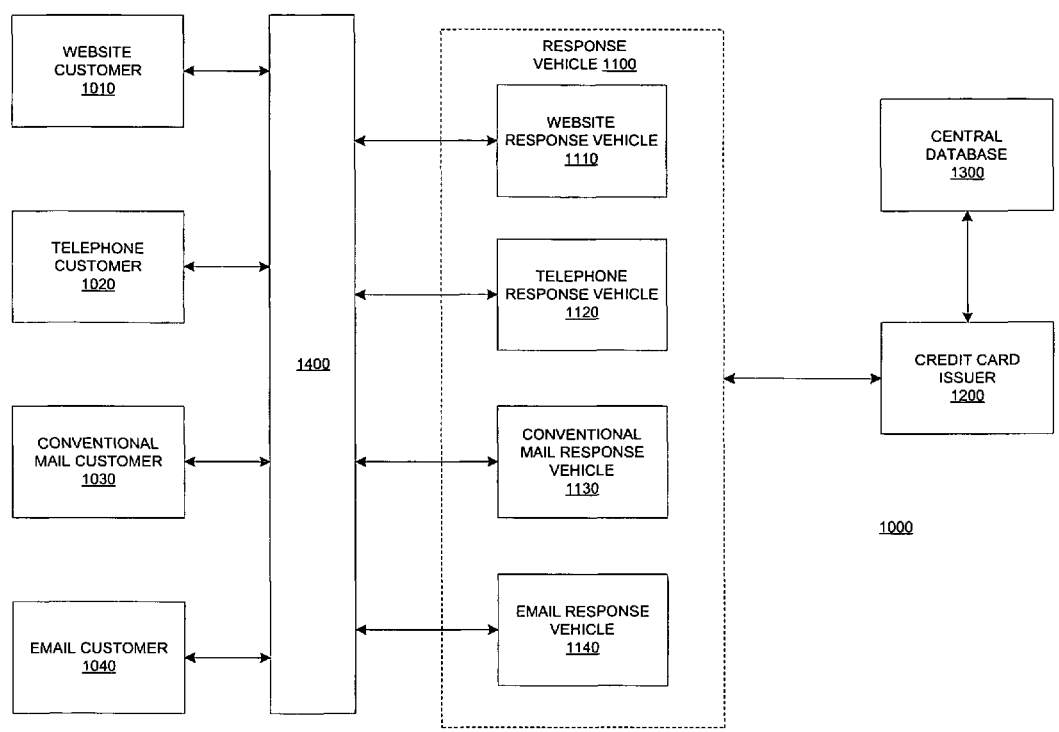
FIG. 1 illustrates an exemplary system environment for implementing embodiments consistent with the present invention.

Reference will now be made in detail to exemplary embodiments consistent with the invention, examples of which are illustrated in the accompanying drawings. Wherever possible, the same reference numbers will be used throughout the drawings to refer to the same or like parts.

The following detailed description refers to the accompanying drawings. While several exemplary embodiments and features of the invention are described herein, modifications, adaptations, and other implementations are possible, without departing from the spirit and scope of the invention. For example, substitutions, additions, or modifications may be made to the components illustrated in the drawings, and the exemplary methods described herein may be modified by substituting, reordering or, adding steps to the disclosed methods. Accordingly, the following detailed description does not limit the scope of the invention.

Embodiments consistent with the present invention are directed to methods, systems, and computer program products for providing financial account products, such as credit card products, with flexible reward incentives. As further disclosed herein, financial products may be provided that enable customers to obtain greater benefits for purchases made at one or more merchants individually chosen by each customer. Such merchants may comprise preferred or favorite merchants of a customer. As used herein, the term "merchant" includes any business entity that is capable of public commerce and in particular is capable of processing transactions through a credit network (such as Visa or MasterCard). Merchants include but are not limited to any retail, wholesale, online or mail order business that consumers purchase goods or services from.

Embodiments consistent with the invention may be implemented in various environments, including computer-based environments, such as personal computers, workstations, servers, laptops, personal digital assistants (PDAs), mobile phones, handheld devices, and other computing devices, workstation, networked and other computing-based environments with one or more customers. The present invention, however, is not limited to such examples and embodiments consistent with the invention may be implemented with other platforms and in other environments.

By way of example, embodiments consistent with the invention may be implemented using conventional personal computers (PCs), desktops, hand-held devices, multiprocessor computers, pen computers, microprocessor-based or programmable consumer electronics devices, minicomputers, mainframe computers, personal mobile computing devices, mobile phones, portable or stationary personal computers, palmtop computers or the like.

The storage media referred to herein symbolize elements that temporarily or permanently store data and instructions. Although storage functions may be provided as part of a computer, memory functions can also be implemented in a network, processors (e.g., cache, register), or elsewhere. Various types of storage mediums can be used to implement features of the invention, such as a read-only memory (ROM), a random access memory (RAM), or a memory with other access options. Further, memory functions may be physically implemented by computer-readable media, such as, for example: (a) magnetic media, like a hard disk, a floppy disk, a magnetic disk, a tape, or a cassette tape; (b) optical media, like an optical disk (e.g., a CD-ROM), or a digital versatile disk (DVD); (c) semiconductor media, like DRAM, SRAM, EPROM, EEPROM, memory stick, and/or by any other media, like paper.

Embodiments consistent with the invention may also include computer program products that are stored in a computer-readable medium or transmitted using a carrier, such as an electronic carrier signal communicated across a network between computers or other devices. In addition to transmitting carrier signals, network environments may be provided to link or connect components in the disclosed systems. Networking environments are commonplace in offices, enterprise-wide computer networks, intranets and the Internet (i.e., the World Wide Web). The network may be a wired or a wireless network. To name a few network implementations, the network may be, for example, a local area network (LAN), a wide area network (WAN), a public switched telephone network (PSTN), an Integrated Services Digital Network (ISDN), an infrared (IR) link, a radio link, such as a Universal Mobile Telecommunications System (UMTS), Global System for Mobile Communication (GSM), Code Division Multiple Access (CDMA), or a satellite link.

Systems, methods, and computer program products consistent with the present invention may provide flexible incentives to new or existing customers of credit card issuers and other financial institutions. Consequently, systems, methods, and computer program products consistent with the present invention may enable a customer to obtain greater benefits for purchases made by the customer at one or more merchants chosen by the customer. More specifically, systems, methods, and computer program products consistent with the present invention may obtain a list of merchant(s) selected by the customer and provide the customer additional rewards or benefits for purchases made at the selected merchant(s.) The list of merchant(s) may be designated with or without limitations defined by the credit card issuer or financial institution.

FIG. 1 illustrates an exemplary system environment 1000 in which embodiments of the present invention may be implemented. As illustrated in FIG. 1, system environment 1000 includes a plurality of customers (consumers) (1010-1040), a response vehicle system 1100 including a plurality of different response vehicles (1110-1140), a credit card issuer 1200, a central database 1300, and a communications channel 1400. While systems, methods, and computer program products consistent with the present invention are described herein with respect to credit cards and credit card accounts, the present invention may be used for any type of financial product or account for purchasing goods or services, such as a debit card, charge card, smartcard, gift card, pre-paid card, Discover card, Amex card, ATM card, direct debit account, checking account, etc., wherein the account is issued or managed by a financial institution or entity.

Each customer in system environment 1000 may be associated with a different customer category. For instance, customer 1010 may be a web site customer that accesses and retrieves information through a web site on the World Wide Web of the Internet. The web site may be a branded web site operated by one or more vendors, or may be a web site operated by a credit card issuer 1200. Customer 1020 may be a telephone customer that accesses and receives information using conventional telephonic communication techniques and systems. This includes, for example, wireline and wireless telephony systems. Customer 1030 may be a conventional mail customer that accesses and receives information by conventional mail techniques and services. This includes, for example, a customer that is part of a credit card issuer's mailing list. Finally, customer 1040 may be a customer that accesses and receives information using electronic mail services. Customers 1010-1040 may also represent entities (such as an individual, a group of individuals, corporate entities, or any combination thereof) that hold credit card accounts with credit card issuer 1200. The categories of customers illustrated in FIG. 1 are exemplary and should not be considered limiting. For example, a variety of different customer categories may also be implemented in environment 1000, such as customers using kiosk computers or personal digital assistants (PDAs.) Alternatively, a credit card issuer may only allow one of a few different types of categories for customers (e.g., mail only customers, or mail and web site customers.)

Response vehicle 1100 represents a system for handling communications between the customers 1010-1040 and credit card issuer 1200. Response vehicle 1100 may be part of a credit card issuer's network and, as shown in FIG. 1, include one or more response vehicles 1110-1140 that correspond to different categories of customers 1010-1040. Each response vehicle is responsible for handling communications to and from customers based on each customer's category. For example, web site response vehicle 1110 may handle Internet related communications, such as web-based transactions, between customer 1010 and credit card issuer 1200. Telephone response vehicle 1120 handles telephonic communications between the customer 1020 and credit card issuer 1200. Thus, in the event credit card issuer 1200 wishes to solicit customers telephonically, response vehicle 1120 includes the necessary systems to support such operations including, for example, operators and telecommunications equipment to communicate with customers 1020. Response vehicle 1130, on the other hand, includes the necessary systems and organizations to handle conventional mail processing to and from customers 1030. Response vehicle 1140 includes the necessary systems and organizations to process electronic mail transactions with customers 1040. Response vehicle 1100 may receive responses from the customers and forward them to credit card issuer 1200 for appropriate processing. Notifications to the customers may also be performed from issuer 1200 to the customer through response vehicle 1100. The notifications may include, for example, messages indicating acceptance of a reward incentive credit card product offered by credit card issuer 1200. Furthermore, response vehicle 1100 may provide the reward incentive credit card products to accepted customers through an appropriate response vehicle, such as conventional mail response vehicle 1130.

Communication channel 1400 facilitates communications between the various customers and response vehicle 1100 illustrated in FIG. 1. Such communications may include communications related to offering and issuing lines of credit to selected customers. Communications channel 1400 may include, for example, a conventional mail distribution network such as that provided by the U.S. Postal Service, a telephony-based network, a local area network (LAN), a wide area network (WAN), a dedicated intranet, the Internet, and/ or a wireless network. Further, any suitable combination of wired and/or wireless components and systems may be incorporated into communications channel 1400. Any suitable combination of point-to-point communications or networked communications may also be incorporated into communication channel 1400 to facilitate communication between the different entities illustrated in FIG. 1. Moreover, any part of communication channel 1400 may be implemented through traditional infrastructures or channels of trade to permit operations associated with credit card offers to be performed manually or in-person by the various entities illustrated in FIG. 1.

Credit card issuer 1200 receives communication information from response vehicle 1100 and processes it using central database 1300. Central database 1300 may contain various information including, for example, credit information, potential customer lists, risk scores for potential and current customers, approved customers, credit limits for approved customers, customer information, purchase information, authorization information, etc. Central database 1300 also can include merchant data, such as merchant identification ("ID"), merchant description, etc. Merchant ID is a unique identifier assigned to each merchant capable of processing transactions through the credit network. For example, Visa or MasterCard may assign a unique identifier to each merchant that is capable of processing Visa or MasterCard transactions. For each transaction that is processed, the transaction data that comes through includes the merchant ID such that one can determine the location of a particular transaction. Merchant description is created by each merchant and can include any kind of information desired by the merchant, such as the name of the merchant, location of the merchant, etc.

Credit card issuer 1200 also sends information to response vehicle system 1100 for delivery to the appropriate customers. In one embodiment, credit card issuer 1200 is responsible for providing various credit cards and establishing associated accounts. Credit card issuer 1200 may include one or more of the following: a bank, an acquiring bank, a merchant bank, a merchant or any commercial institution capable of providing a financial account, such as a credit card account, consistent with the features disclosed herein. Further, although FIG. 1 only illustrates one credit card issuer 1200, it is of course possible that more than one credit card issuer be provided in system environment 1000.

Figure 2:
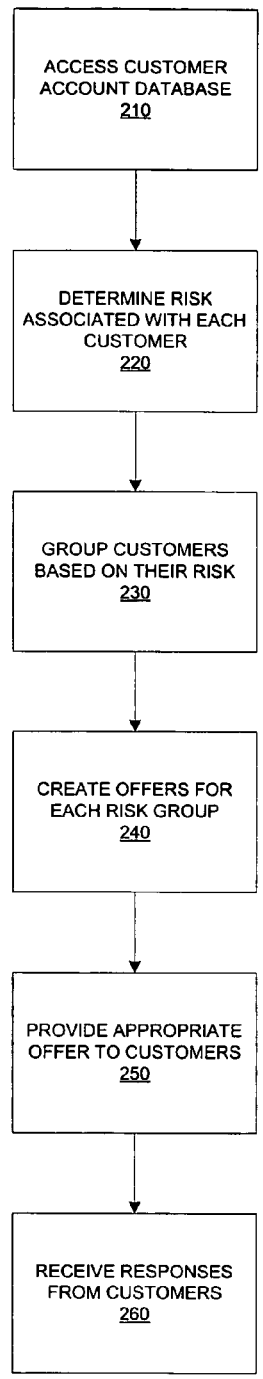
FIG. 2 is a flowchart of an exemplary process for offering customers a reward incentive account, consistent with an embodiment of the present invention.

FIG. 2 illustrates an exemplary process associated with providing offers to customers for reward incentive credit card products, consistent with an embodiment of the present invention. Although the present invention is described with reference to credit card products, one skilled in the art would realize that the present invention may be applied with any type of financial account and/or products without departing from the scope of the invention.

According to one aspect of the invention, credit card issuer 1200 may access a customer account database located in central database 1300 (Step 210). The customer account database may include financial account information associated with each customer of credit card issuer 1200 and/or other customers. The financial account information may include, for example, credit card account data, such as account numbers and account parameters for each credit line associated with a customer (i.e., interest rates, credit limits, terms and conditions.) The financial account information may also include payment history information and personal financial information, such as annual income, debts and assets, etc. for customers of credit card issuer 1200. The customer account database may also include financial information of potential customers of credit card issuer 1200. A potential customer may be an individual who may not have a credit card account with credit card issuer 1200, but may be targeted as an individual whom credit card issuer 1200 may want to offer a reward incentive credit card product, consistent with the present invention.

Once the customer account database is accessed, credit card issuer 1200 may determine a financial risk value associated with each customer in the account database (Step 220). A customer's financial risk value may be associated with a risk that the customer may have potential for making late payments and overcharging a financial account based on past payment history data. Also, a customer's financial risk value may be associated with the customer's income and debts. Credit card issuer 1200 may consider several factors when determining a financial risk value for a customer. Such factors may be based on credit information received from one or more credit information sources (i.e., sources that provide credit information to credit card issuer 1200). Credit information may also be provided to credit card issuer 1200 when customers respond to credit card offers from issuer 1200. Moreover, credit information may be requested by issuer 1200 directly from a customer in previous solicitations. Credit information may include credit history information and/or personal information (e.g., income, employment status, etc.) that is used when evaluating a customer's credit worthiness. Credit information sources may comprise commercial credit information source (such as TRW/Experian, Equifax and TransUnion or a similar commercial credit service bureau) and/or private credit information services. Credit information sources may also represent credit information that was provided by customers, such as when a customer applied for an existing credit card.

In one embodiment, credit card issuer 1200 may group customers based on their determined risk value (Step 230). Accordingly, customers with similar financial risk values may be grouped together and credit card issuer 1200 may generate offers for a reward incentive credit card product based on the different groups of customers (Step 240). For example, credit card issuer 1200 may allocate customer to one of four groups based on each customer's financial risk value. The first group may be associated with customers whose financial risk values are the highest among the four groups, while the fourth group may be associated with customers whose financial risk values are the lowest. Accordingly, credit card issuer 1200 may generate an offer for a customer in the first group for a reward incentive credit card product that includes terms and conditions different than those associated with an offer for a customer in the second through fourth groups. Alternatively, only specific group(s) of customers may be offered a credit card product with a reward incentive program, while the other groups receive other offers or no offer at all.

Although embodiments of the present invention discussed below describe an exemplary reward incentive in the form of reward points, one skilled in the art would realize that various other configurations may be employed by methods, systems, and computer program products consistent with certain principles related to the present invention without affecting its scope. For instance, reward incentives in the form of cash back, traveler miles, etc. may also be employed In addition to various credit limits and interest rates associated with an offered reward incentive credit card product, credit card issuer 1200 may adjust the type of reward incentive parameters that may be associated with an offered credit card product. In one embodiment, the reward incentive parameter may include the option for a customer to identify one or more merchants for receiving reward points based on purchases at those merchants. The reward points may be at the same level per dollar spent as purchases made at merchants pre-designated by the credit card issuer (if any), or the reward points for purchases at a customer's preferred merchant may be allotted at a higher rate. In addition, or alternatively, a customer with a high financial risk may be offered a reward incentive account that includes a reward parameter that awards X (i.e., 5) number of reward points for every one dollar spent using the credit card product. A low financial risk customer, however, may be offered a reward incentive account including a reward parameter that awards a higher number of reward points for every dollar spent using the credit card product such as X+10 (i.e., 15 points). One skilled in the art would realize that the types of a reward parameters offered by credit card issuer 1200 may vary and is not limited to the above example. For instance, credit card issuer 1200 may take into consideration predetermined criteria to adjust the number of reward points that may be awarded to a customer. Such criteria may include the timeliness of payments received by credit card issuer 1200 (i.e., reducing the number of reward points for late payments, and/or adding reward points for payments received before a due date) and the amount of a received payment in relation to a minimum payment due to credit card issuer 1200. Furthermore, one skilled in the art would realize that credit card issuer 1200 may implement one or more criteria to determine the amount of reward points to associate with a reward incentive account.

Once the reward incentives offers are created, credit card issuer 1200 may send the offers to response vehicle 1100 for distribution to respective customers (Step 250.) Each response vehicle in vehicle 1100 processes the offers in order to provide them to the customers through communication channel 1400. For instance, response vehicle 1110 formulates offers for generation and viewing on one or more web sites. The web sites may be associated with a card issuer's web site or sites that are operated by selected vendors. Once each response vehicle has processed the offers, they are sent to the specified customers for response. Customers 1010-1040 may respond (accept or decline) to the offers using the medium associated with their category. The responses are sent back to response vehicle 1100, where they are processed for presentation to card issuer 1200 (Step 260).

Based on the category of a customer, responses may or may not be processed immediately. For instance, responses may be received and processed instantaneously and/or automatically for customers 1010 and 1020, while responses from customers 1030 may be delayed. For example, suppose a customer 1010 using a personal computer views a web site operated by credit card issuer 1200. The site may include a designated page that presents the customer with the reward incentive offer determined by credit card issuer 1200. The customer may decide to accept or decline the offer by merely selecting an icon representing their choice and perhaps providing financial information through the web site. The response is then sent back to response vehicle 1110. Response vehicle 1110 processes the response and prepares it for presentation to credit card issuer 1200. The response is processed at credit card issuer 1200 and a notification may be sent back to customer 1010 through response vehicle 1110. The notification may indicate to the customer that their response to an offer has been processed and their acceptance to receive a reward incentive credit card product from credit card issuer 1200. The notifications may be displayed through a web page that the customer was viewing when the offer was presented or on a separate web page. In one embodiment, the customer may check the web page to receive the notification. Additionally or alternatively, credit card issuer 1200 may provide an e-mail to the customer including the notification or a message indicating to the customer to check a particular web site to receive the notification.

As can be seen, a customer who has accepted an offer through a web site may receive immediate notification of an approval for a credit card provided by credit card provider 1200. On the other hand, a customer who has been solicited by conventional mail, such as customer 1030, may respond to the offer by mailing back an acceptance form to the card issuer. The acceptance form may be received and processed by response vehicle 1130, and eventually processed by credit card issuer 1200. Notification of an acceptance by credit card issuer 1200 may then be sent back to the customer using the same conventional mail process.

There may be a plurality of variations available to credit card issuer 1200 when communicating with customers. That is, mail customer 1030 may wish to respond by telephone or through a web site. Additionally, customers may respond by one medium, and request notification by another. For instance, mail customer 1030 who has received an offer in the mail, may respond by mail, yet request notification by email. Accordingly, a variety of user-friendly options are available to customers for receiving and responding to the offers presented by credit card issuer 1200. The above descriptions are for illustration purposes alone and should not be viewed as limitations to the present invention. One of ordinary skill in the art would realize that any number of combinations of communication techniques may be implemented without departing from the principles of the present invention.

Figure 3:
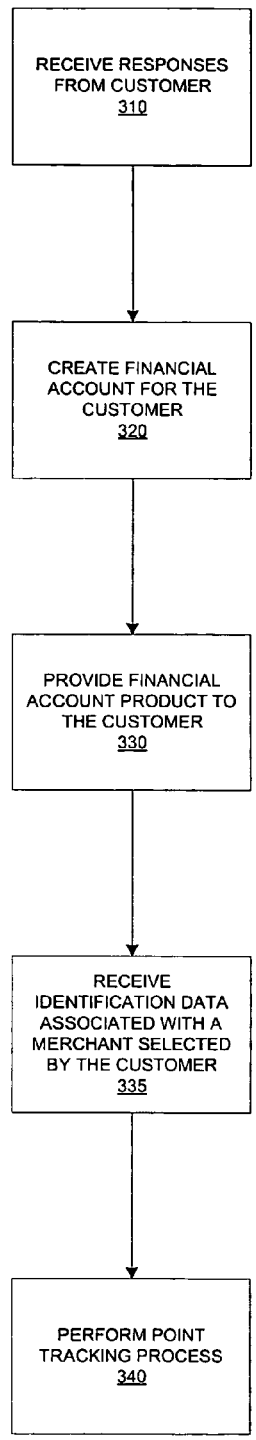
FIG. 3 is a flowchart of an exemplary process for processing responses from customers, consistent with an embodiment of the present invention.

FIG. 3 illustrates an exemplary process that may be performed by credit card issuer 1200 when processing a customer's acceptance to an offer described with respect to FIG. 2. As shown, credit card issuer 1200 may receive a response from a customer indicating their acceptance to receive a reward incentive credit card product from credit card issuer 1200 (Step 310). In one embodiment, the response may include financial information provided by the customer. Credit card issuer 1200 may use this information to determine a credit worthiness for the customer to determine the customer's eligibility to receive a reward incentive credit card product. This configuration may be useful where the customer's financial information may have changed since credit card issuer 1200 determined a financial risk value for the customer as part of step 220. In the event the customer's financial information has changed such that credit card issuer 1200 deems the customer ineligible to receive a reward incentive credit card product, credit card issuer 1200 may notify the customer of ineligibility through response vehicle 1100.

Referring back to FIG. 3, credit card issuer 1200 may create a reward incentives financial account for the customer (Step 320). Creating such an account may include providing an account segment in central database 1300 for the customer. The segment may include financial account parameters associated with the created account, such as fields including data associated with an account number, customer identification information, interest rates for one or more lines of credit associated with the account, penalty fee amounts and associated terms and conditions for receiving a penalty fee, a credit limit for each line of credit associated with the account, and any other financial account parameter information known in the art. In addition to these parameters, credit card issuer 1200 may also include reward incentive parameters associated with the customer's account. The reward incentive parameters may include, but are not limited to, a reward point distribution parameter, a preferred reward point distribution parameter, total reward point parameter and an aggregate reward point parameter.

The reward point distribution parameter may be a value that determines the number of reward point(s) that are to be associated with the reward incentive account for each predetermined amount spent using the credit card product. For example, the reward point distribution parameter may be a value reflecting a number of reward point(s) that are to be associated with the reward incentive account for each predetermined amount spent using the credit card product. The preferred reward point distribution parameter may reflect a number of additional reward point(s) that are to be associated with the reward incentive account for each predetermined amount spent using the credit card product at merchants selected by the customer. The total reward point parameter may reflect a total number of reward points that are associated with the account based on the reward point distribution parameter and preferred reward distribution parameter. The aggregate reward point parameter may reflect the customer's aggregate number of reward points associated with the customer's account. One skilled in the art would realize that the reward incentive parameters described above are exemplary and not intended to be limiting. Credit card issuer 1200 may implement one or more of these and other reward incentive parameters to comply with their business goals and plans.

Once the reward incentive account has been created and the appropriate parameters set, credit card issuer 1200 may create and provide a reward incentive credit card product to the customer (Step 330). Credit card issuer 1200 may also receive identification data associated with one or more merchants selected by the customer (Step 335). For instance, web site customer 1010 may select a merchant from a pull-down menu by accessing the web site or a secure page offered by credit card issuer 1200. Alternatively, or in addition, web site customer 1010 may search for a particular merchant by entering text into a text box included in a web site or a secure page associated with credit card issuer 1200. In another embodiment, the customer can also provide a customer ID and password for authentication by credit card issuer 1200. Thereafter, the customer may select a merchant having an ID (as discussed above) that is recognized by credit card issuer 1200 as an acceptable merchant to be included in the merchant list. For example, in addition to being able to select traditional merchants, such as Sears and Wal-Mart, the customer may select one or more on-line merchants (e.g., Amazon.com, E-Bay, etc.). In one embodiment, credit card issuer 1200 may provide a list of merchants from which the customer may choose. The list of merchants may be provided based on one or more criteria defined by credit card issuer 1200. For example, credit card issuer 1200 may provide the customer a list of merchants that have a pre-established relationship with credit card issuer 1200, such as a partnership, strategic alliance, joint venture, business partnerships, etc. Credit card issuer 1200 may access data stored in central databases 1300 to locate merchants having a pre-established relationship with credit card issuer 1200 and provide the list of merchants to the customer. Alternatively, or in addition, credit card issuer 1200 may locate selected merchants based on characteristics of the merchants, such as a merchant's popularity, size of the merchant in terms of number of locations or sales figures, and location of the merchant (e.g., nationwide or located in a geographic zone associated with the customer). Credit card issuer 1200 may provide this list of merchants to the customer for selection of one or more merchants as a favorite or preferred merchant. Credit card issuer 1200 may identify the popularity of a merchant based on one or more criteria, such as the information obtained from surveys associated with the brand name of a merchant, sales figures of a merchant, number of locations of a merchant, etc. In another embodiment, in response to a customer request to search for merchants, credit card issuer 1200 may compare text provided by the customer in the request with merchant descriptions stored in central database 1300 to identify one or more matching merchants for the customer. Moreover, credit card issuer 1200 may access data stored in central database 1300 to locate one or more merchants that the customer has performed purchase transactions with over a certain period of time, such as the previous six months. Credit card issuer 1200 may also provide a list of these identified merchants to the customer. The customer may select one or more of the listed merchants as a favorite or preferred merchant. In a preferred embodiment, credit card issuer 1200 may implement processes that limit the customer to selecting up to three merchants. However, embodiments consistent with the invention may allow credit card issuer 1200 to implement processes that enable the customer to select any number of preferred merchants from the list or select up to a predetermined number of merchants. In one aspect, credit card issuer 1200 may vary the predetermined number of merchants the customer may select based on one or more criteria defined by credit card issuer 1200. Moreover, in another embodiment, credit card issuer 1200 may be configured to allow the customer to update the customer's selected merchants. In accordance with a preferred embodiment, credit card issuer 1200 may restrict the number of times the customer can change the selected merchants. For example, credit card issuer 1200 may allow the customer to make only three changes to the customer's selection of merchants during a given time period (e.g., a year). One skilled in the art would appreciate that many variations to the disclosed embodiments may be implemented by credit card issuer 1200. For instance, credit card issuer 1200 may be configured to recognize multiple changes to the selected merchants by the customer during a given time period (e.g., during a single day) as a single change to the selected merchants.

Further, to prevent the customer from selecting a particular merchant twice, credit card issuer 1200 may remove the selected merchant from the list of merchants provided to the customer. Credit card issuer 1200 may also compare a customer's current selection of merchants with previously selected merchants to prevent multiple selections of the same merchant. Credit card issuer 1200 may store data reflecting the customer's selected merchants in central database 1300. In one embodiment, credit card issuer 1200 may include additional merchants in the list of selected merchants that are logically related to the merchant selected by the customer. For example, if the customer selects one merchant of a particular franchise having a particular merchant ID, credit card issuer 1200 may identify other merchants of the franchise by analyzing the merchant descriptions stored in central database 1300. Credit card issuer 1200 may include the other merchants in the selected list of merchants. Credit card issuer 1200 may also consider the other merchants as separate entities. Alternatively, if the customer selects a parent company merchant, credit card issuer 1200 may locate all subsidiaries of the parent company by analyzing the merchant descriptions stored in central database 1300 and include them in the selected list of merchants. Credit card issuer 1200 may be configured to include the additional merchants based on any criteria established by credit card issuer 1200 or another system or entity. For instance, credit card issuer 1200 may be configured to include the additional merchants in the list for the largest or most popular merchants or for merchants having established relationships with credit card issuer 1200, but not for the others. Returning to FIG. 3, credit card issuer 1200 may perform a point tracking process based on one or more purchases made with the credit card product (Step 340). This step may be performed in accordance with, for example, the embodiment of FIG. 4.

Figure 4:
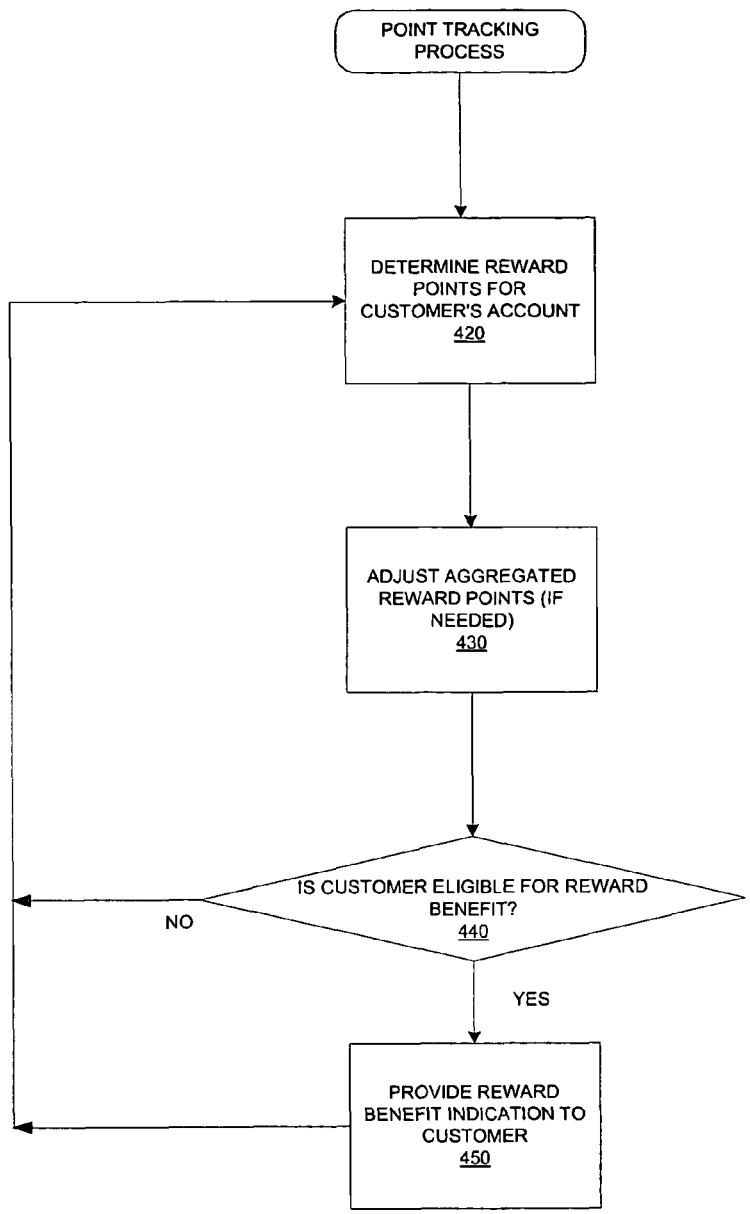
FIG. 4 is a flowchart of an exemplary point tracking process, consistent with an embodiment of the present invention.

FIG. 4 shows a flowchart of an exemplary point tracking process that may be executed by a processor within credit card issuer 1200, consistent with an embodiment of the present invention. In one embodiment, credit card issuer 1200 may determine the amount of reward points to associate with the customer's account (Step 420). Credit card issuer 1200 may determine the amount of reward points periodically or at dynamically selected times, such as periodically or at the end of a billing cycle or month. In one embodiment, credit card issuer 1200 may perform this determination by analyzing the customer's transactions over a given period or billing cycle and determining reward points or other types of incentives to award for each qualified transaction. For example, credit card issuer 1200 may, for example, analyze and compare the merchant ID associated with a transaction with the merchant IDs associated with the list of merchants associated with the customer's account, which may be stored in central database 1300. In addition to reward points being given based on purchase volume, reward points may also be given for a number of behaviors as defined by credit card issuer 1200, including but not limited to, points by transaction, points by payment or payment size, points by number of transactions of a minimum size, etc.

In one embodiment, credit card issuer 1200 may determine the total reward points to include in the total reward point parameter based on the reward point distribution parameter and the preferred reward point distribution parameter. For example, suppose a reward point distribution parameter indicates that the customer's account is to receive 10 reward points for every dollar spent (which may be rounded to the nearest dollar value) using the customer's account. Further, suppose a preferred reward point distribution parameter indicates that the customer's account is to receive an additional 15 reward points for every dollar spent (which may be rounded to the nearest dollar value) using the customer's account at one or more merchant(s) included in the customer's favorite or preferred merchants list. Based on this example, if the customer's account was used to purchase $1,000 worth of goods and $300 of those purchases were performed at merchants included in the customer's preferred merchant list, credit card issuer 1200 may include 14,500 points in the total reward point parameter (e.g., (1,000×10)+(300×15)). Further, in a preferred embodiment, credit card issuer 1200 may restrict "double counting" in its determination of the total reward points. For example, based on the example above, credit card issuer 1200 may only include (700×10)+(300×15), or 11,500 in the total reward point parameter.

Credit card issuer 1200 may also implement a tiered reward incentive program. For instance, credit card issuer 1200 may provide a certain amount of reward points for purchases made up to a certain predetermined limit and then provide a higher number of reward points for purchases made after reaching the predetermined limit. For example, following the above described example using a reward point distribution parameter equal to 10, credit card issuer 1200 may provide 5 reward points (e.g., reward point distribution parameter minus 5) for purchases made up to $3,000, then provide 10 reward point (e.g., reward point distribution parameter) for purchases made after reaching $3,000 up to $10,000, and then provide 13 reward points (i.e., reward point distribution parameter+3) for purchases made after reaching $10,000. Similarly, tiered reward incentives can be given with reference to the preferred reward point distribution parameter. One skilled in the art will appreciate that any combination of the tiered and fixed reward incentive programs may be used. For instance, a fixed number of reward points, such as a number equal to the preferred reward point distribution parameter, may be awarded for all purchases made at merchants selected by the customer, while a tiered program-based number of reward points may be awarded for all other purchases. Alternatively, credit card issuer 1200 may apply a tiered program reward incentive for purchases made at merchants selected by the customer and a fixed program reward incentive for all other purchases. Credit card issuer 1200 may also implement multiple tiered reward incentive programs. For example, purchases made with a customer's account at one group of merchants, such a retail merchants, may be processed based on a first tiered program, and purchases made at another group of merchants, such as on-line merchants, may be processed based on a second tiered incentive program.

Credit card issuer 1200 may also make adjustments to the number of reward points included in the total reward point parameter based on other reward incentive parameters associated with the customer's account and/or the determinations performed in Step 420. For example, in addition to the reward incentive parameters discussed above, credit card issuer 1200 may include a redemption ratio parameter to prevent abuse by the customer. For example, if the customer uses the customer's account to make significantly more purchases at merchants selected by the customer than for other purchases, then the customer's account may not be profitable to credit card issuer 1200. Therefore, credit card issuer 1200 may include a redemption ratio parameter that defines a required ratio between purchases made at the merchants selected by the customer and other purchases at non-selected merchants. For example, suppose credit card issuer 1200 included a redemption ratio parameter requiring the value of purchases made by the customer at the merchants selected by the customer not to be more than three times the value of all other purchases made by the customer. Thus, if credit card issuer 1200 determined in step 420 that the customer's account was used to make purchases valuing $600 with $500 spent at one or more merchants selected by the customer, then credit card issuer 1200 may adjust the total reward points based on one or more criteria defined by credit card issuer 1200. For instance, based on a predetermined redemption ratio parameter, credit card issuer 1200, may apply only the preferred reward incentive for $300 of the $500 spent at the merchants selected by the customer.

Additionally, credit card issuer 1200 may include a cap spending parameter that enables credit card issuer 1200 to provide a preferred reward incentive for purchases made at merchants selected by the customer up to a certain predetermined value, such as $300. Additionally, credit card issuer 1200 may implement controls that prevent particular transactions that qualify for the preferred reward incentive, from receiving any additional reward points, even if the transaction qualifies for the preferred reward incentive for another merchant chosen by the customer. One skilled in the art will realize that the examples described above are not intended to be limiting and methods, systems, and computer program products consistent with certain principles related to the present invention may incorporate any combination of reward incentive parameters, or none at all, to adjust the number of reward points included in the total reward point parameter.

Returning back to FIG. 4, once credit card issuer 1200 has determined and adjusted the total reward points for the customer's account based on the reward incentive parameters, the aggregate reward point parameter may be adjusted (Step 430). For example, if the total reward point parameter, after any adjustments made by credit card issuer 1200, is 1,000 points and the aggregate reward point parameter is 20,000 points, credit card issuer 1200 may adjust the 20,000 points to a new value of 21,000 points. In one embodiment, credit card issuer 1200 may allow the total reward point parameter to be a negative number, based on any penalty parameters associated with the customer's account. In this configuration, the number of reward points in the aggregate reward point parameter may be reduced by this negative value, thus providing an additional penalty to the customer's account based on undesirable activities associated with the customer's account (i.e., abuse, over-charging, etc.)

Following the adjustments (if any) of the aggregate reward point parameter, credit card issuer 1200 may determine whether the customer's account is eligible for a reward benefit based on the number of points included in the aggregate reward point parameter (Step 440). This determination may be based on the types of consumer goods that are offered by either credit card issuer 1200 and/or third party vendors that accept the reward points issued by credit card issuer 1200. Consumer goods may include goods and/or services that are provided by an entity, such as travel services provided by an airline, magazine subscriptions, music CDs, and/or items offered by a department store. For example, credit card issuer 1200 may maintain a database that includes a list of all of goods and/or services that are offered by credit card issuer 1200 and any third party vendor that accepts the reward points issued by credit card issuer 1200. The list may include, for example, various consumer goods and services offered and the number of reward points required by a customer to obtain them. Credit card issuer 1200 may analyze the list and the number of points included in the aggregate reward point parameter to determine the types of goods or services the customer may be eligible to receive.

In the event the customer is not eligible to receive any consumer goods (Step 440; NO), the point tracking process returns to Step 420. If credit card issuer 1200 determines that the customer's account is eligible for one or more rewards benefits based on the aggregate reward point parameter (Step 440; YES), a reward benefit indication may be created and provided to the customer through response vehicle 1100 (Step 450). In one embodiment, the reward benefit indication may identify the types of goods or services the customer is eligible to receive and the identity of the provider of these goods or services. Also, credit card issuer 1200 may include in the reward benefit an indication of goods or services that the customer may be eligible to obtain with an additional number of reward points. For example, the indication may include a message reflecting that the customer may obtain one or more items with an additional 2,000 points. Once the reward benefit indication is provided to the customer, the point tracking process may return to Step 420.

As described, methods, systems, and computer program products consistent with certain principles related to the present invention enable a customer to receive a financial product, such as a credit card product, from a credit card issuer 1200. The credit card product enables the customer to accumulate reward points based on purchases at one or more merchants selected by the customer. The reward points may be associated with goods or services that may be obtained by the customer. Credit card issuer 1200 may manage the credit card product by adjusting the number of reward points based on desired criteria, such as a redemption ratio. Accordingly, credit card issuer 1200 provides a flexible credit card product that allows the customer to receive reward points for purchases using a customer's account at one or more merchants selected by the customer for use to obtain consumer goods that may be provided by credit card issuer 1200 or one or more third party vendors.

Although embodiments of the present invention have been described based on the system environment 1000 shown in FIG. 1, one skilled in the art will realize that various other configurations may be employed by methods, systems, and computer program products consistent with certain principles related to the present invention without affecting its scope. Furthermore, the types of reward parameters and their use in the point tracking process described in FIG. 4 may be adjusted to meet the needs of the credit card issuer and its customers, without departing from the spirit and scope of the present invention.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims. For example, the process steps shown in the drawings are not limited to the sequences described above. Variations of these sequences, such as the removal and/or the addition of other process steps may be implemented without departing from the spirit and scope of the present invention. For example, in one embodiment, credit card issuer 1200 may adjust an account's reward point distribution parameter based on changes to a corresponding customer's financial risk value. In this configuration, credit card issuer 1200 may perform periodic financial risk assessments for each of its reward incentive credit cardholders. Based on a change in financial risk associated with a customer, the amount of reward points per dollar spent may be adjusted by credit card issuer 1200. For example, suppose a high credit risk customer of a reward incentives credit card has an initial reward point distribution parameter that allows the customer's account to obtain 20 points for each dollar spent. The distribution parameter may be adjusted by credit card issuer 1200 to reflect that the customer's account will obtain 30 points per dollar spent based on a determination that the customer's financial risk has decreased (i.e., the customer is now less of a financial risk to credit card issuer 1200 and thus more incentives may be provided to reward the customer.) Credit card issuer 1200 may adjust the distribution parameter to decrease the number of reward points per dollar spent.

A skilled artisan will appreciate that the amount of reward points and reward incentive parameters can also be determined or updated by considering various factors over time that affect valuation determinations, such as cost of rewards, profit margins, length of relationships, financial forecasts, number of reward points redeemed, number of reward points that remain outstanding, number of reward points that have expired, and/or reward points redemption statistics, etc.

For example, in one embodiment, credit card issuer 1200 may execute software that develops a reward incentive model over a given time period by analyzing and testing the results of various combinations and permutations involving the factors discussed above. For example, data regarding the above-mentioned factors stored in central database 1300 can be collected from customers that have been found to provide profitable relationships for credit card issuer 1200 and, using multivariate regression analysis, predictive reward incentive models can be developed to enable the prediction of the best incentive programs for existing and future customers. For instance, after a multivariate regression model identifies the most predictive factors for determining profitability of customers, credit card issuer 1200 may create a profitability model formula including only the identified factors. The formula can weigh each identified factor to minimize the error in generating a predictive profitability score for customers. For example, the multivariate logistic regression model may, by using regression techniques well known in the art, weigh the most predictive of the identified factors more heavily than the least predictive of the identified factors.

Also, the weights may account for differences in the types of data analyzed. For example, the formula, when executed by a processor, may allow a user or a computer process to provide percentages, probabilities, numbers, and/or dollar amounts simultaneously. A small number, such as a probability (e.g., ranging from 0-1) may be weighed more heavily than a large number, such as revenue, to account for the different data types. Although the multivariate logistic regression model described herein initially determines the weights, one skilled in the art will appreciate that the weights may be modified later to comply with experimental results or other personal experience, for example.

After generating the formula, credit card issuer 1200 can create a profitability grid using historical customer data. To accomplish this, credit card issuer 1200 can use the determined weighted combination of factors to determine the profitability score for each current customer of credit card issuer 1200. Credit card issuer 1200 then can generate a profitability grid by dividing these profitability score determinations into a predetermined number of groups. For example, the determined profitability scores may be divided into five groups, each group receiving a group score ranging from a score of 1 (low) to 5 (high). In a preferred embodiment, credit issuer 1200 can determine the range of profitability scores for each group according to the percentage of customers that fall within that range. For example, the range of determined profitability scores containing the highest 20% of the determined profitability scores receives a group score of five (5.) The range containing the next highest 20% of the profitability score determinations receives a group score of four (4,) etc. One skilled in the art will recognize that other scoring methods are possible. The formula and profitability grid may then be used to determine the reward points and/or reward incentive parameters for a particular customer (current or future.) More particularly, credit card issuer 1200 may enter the identified factors associated with a customer into the formula to determine the profitability score of the customer. Credit card issuer 1200 then may use the profitability grid to determine a group score (e.g., 1-5) for the customer based on the determined profitability score.

Credit card issuer 1200 then can make a determination about the reward incentive and/or reward incentive parameters based on the score. For instance, for a customer found to have a group score of five (5) and considered to provide a profitable relationship to the financial institution, credit card issuer 1200 may determine that higher reward incentives and/or reward incentives parameters may be established to reward the customer. On the other hand, if the customer has a lower group score, such as four (4), then credit card issuer 1200 may determine that lower reward incentives and/or reward incentive parameters may be required.

In another configuration, credit card issuer 1200 may collect data and/or statistics regarding transactions made by customers at various merchants. For example, this data may include statistics on the number of transactions customers of credit card issuer 1200 have made at various merchants, the frequency of transactions made by customers of the credit card issuer 1200, increase in purchases made by customers of credit card issuer 1200 because of the reward incentive, forecasts of projected transactions by customers of credit card issuer 1200 at the various merchants, etc. This data can then be provided to the various merchants and credit card issuer 1200 can request monetary compensation or other benefits for the increase in transactions at the various merchants by the customers of credit card issuer 1200.

Additionally, embodiments of the present invention may be applied to financial accounts other than credit card accounts. Any financial institution that provides financial accounts to customers may employ methods, systems, and computer program products consistent with certain principles related to the present invention.

Other embodiments of the invention will be apparent to those skilled in the art from consideration of the specification and practice of the invention disclosed herein. It is intended, therefore, that the specification and examples be considered as exemplary only, with a true scope and spirit of the invention being indicated by the following claims.

What is claimed is:

1. A computer-implemented method to incentivize use of financial accounts, the method comprising:
    establishing, by a computer processor, an electronic record for a financial account of a customer, the establishing including:
        creating a network of preferred merchants according to at least a profitability grid and a profitability model formula,
        determining a profitability for a financial account issuer associated with the financial account for a plurality of incentives for the financial account based upon at least the profitability grid, the profitability model formula, and historical data associated with financial accounts of the customer,
        associating a first incentive with the financial account when a purchase transaction is made by the customer with the financial account with a merchant from the network of preferred merchants, and
        associating a second incentive, which is different from the first incentive, with the financial account when a purchase transaction is made by the customer with the financial account with a non-network merchant that is not among the network of preferred merchants;
    receiving, by the computer processor, a customer selection of at least one new merchant that is not among the network of preferred merchants to add to the network of preferred merchants;
    updating, by the computer processor, the network of preferred merchants by adding the at least one new merchant to the network of preferred merchants based on the customer selection; and
    providing the first incentive or second incentive to the customer based on purchase transactions made using the financial account.

2. The method of claim 1,
    wherein the first incentive includes assigning a first amount of reward points to the financial account,
    wherein the second incentive includes assigning a second amount of reward points to the financial account, and
    wherein the first amount of reward points is higher than the second amount of reward points.

3. The method of claim 1,
    wherein the first incentive includes a first cash-back offer and the second incentive includes a second cash-back offer, and
    wherein the first cash-back offer is an offer for a cash-back amount that is larger than a cash-back amount for the second cash-back offer.

4. The method of claim 1,
    wherein the first incentive includes assigning a first amount of traveler miles,
    wherein the second incentive includes assigning a second amount of traveler miles, and
    wherein the first amount of traveler miles is higher than the second amount of traveler miles.

5. The method of claim 1, further comprising:
    collecting statistics associated with purchase transactions made at a merchant from the network of preferred merchants with the financial account;
    providing the statistics to the merchant; and requesting compensation for the purchases based on the statistics.

6. The method of claim 1, wherein at least one of the first incentive and the second incentive is a tiered incentive.

7. The method of claim 1, wherein the receiving the customer selection of the at least one new merchant comprises:
provisioning a list of merchants not among the network of preferred merchants to the customer; and
receiving the selection of the new merchant from the customer based on the provided list of merchants.

8. The method of claim 7, wherein the list of merchants includes one or more merchants that have previously performed a purchase transaction with the financial account.

9. A system to incentivize use of financial accounts, comprising:
a memory; and
a computer processor that implements a process comprising:
establishing an electronic record for the financial account of a customer, the establishing including:
creating a network of preferred merchants according to at least a profitability grid and profitability model formula,
determining a profitability for a financial account issuer associated with the financial account for a plurality of incentives for the financial account of the customer based upon at least the profitability grid, the profitability model formula, and historical data associated with financial accounts of the customer,
associating a first incentive with the financial account when a purchase transaction is made by the customer with the financial account with a merchant from the network of preferred merchants, and
associating a second incentive, which is different from the first incentive, with the financial account when a purchase transaction is made by the customer with the financial account with a non-network merchant that is not among the network of preferred merchants;
receiving a customer selection of at least one new merchant that is not among the network of preferred merchants to add to the network of preferred merchants;
updating the network of preferred merchants by adding the at least one new merchant to the network of preferred merchants based on the customer selection; and
providing the first incentive or second incentive to the customer based on purchase transactions made using the financial account.

10. The system of claim 9,
wherein the first incentive includes assigning a first amount of reward points to the financial account,
wherein the second incentive includes assigning a second amount of reward points to the financial account, and
wherein the first amount of reward points is higher than the second amount of reward points.

11. The system of claim 9,
wherein the first incentive includes a first cash-back offer and the second incentive includes a second cash-back offer, and
wherein the first cash-back offer is an offer for a cash-back amount that is larger than a cash-back amount for the second cash-back offer.

12. The system of claim 9,
wherein the first incentive includes assigning a first amount of traveler miles,
wherein the second incentive includes assigning a second amount of traveler miles, and
wherein the first amount of traveler miles is higher than the second amount of traveler miles.

13. The system of claim 9, wherein the process further comprises:
collecting statistics associated with purchase transactions made at a merchant from the network of preferred merchants with the financial account;
providing the statistics to the merchant; and
providing a request to the merchant for compensation for the purchases based on the statistics.

14. The system of claim 9, wherein at least one of the first incentive and the second incentive is a tiered incentive.

15. The system of claim 9, wherein receiving the customer selection of the at least one new merchant comprises:
providing a list of merchants not among the network of preferred merchants to the customer; and
receiving the selection of the new merchant from the customer based on the provided list of merchants.

16. The system of claim 15, wherein the list of merchants includes one or more merchants that have previously performed a purchase transaction with the financial account.

17. A non-transitory computer-readable medium storing a program for causing, when executed by a computer processor, a computer to perform operations comprising:
establishing an electronic record for a financial account, the establishing including:
creating a network of preferred merchants according to at least a profitability grid and profitability model formula,
determining a profitability for a financial account issuer associated with the financial account for a plurality of incentives for the financial account of the customer based upon at least the profitability grid, the profitability model formula, and historical data associated with financial accounts of the customer,
associating a first incentive with the financial account when a purchase transaction is made by the customer with the financial account with a merchant from the group of preferred merchants, and
associating a second incentive, which is different from the first incentive, with the financial account when a purchase transaction is made by the customer with the financial account with a non-network merchant that is not among the group of preferred merchants;
receiving a customer selection of at least one new merchant that is not among the group of preferred merchants to add to the group of preferred merchants;
updating the group of preferred merchants by adding the at least one new merchant to the group of preferred merchants based on the customer selection; and
providing the first incentive or second incentive to the customer based on purchase transactions made using the financial account.

18. The non-transitory computer-readable medium of claim 17,
wherein the first incentive includes assigning a first amount of reward points to the financial account,
wherein the second incentive includes assigning a second amount of reward points to the financial account, and
wherein the first amount of reward points is higher than the second amount of reward points.

19. The non-transitory computer-readable medium of claim 17,
 wherein the first incentive includes a first cash-back offer and the second incentive includes a second cash-back offer, and
 wherein the first cash-back offer is an offer for a cash-back amount that is larger than a cash-back amount for the second cash-back offer.

20. The non-transitory computer-readable medium of claim 17,
 wherein the first incentive includes assigning a first amount of traveler miles,
 wherein the second incentive includes assigning a second amount of traveler miles, and
 wherein the first amount of traveler miles is higher than the second amount of traveler miles.

21. The non-transitory computer-readable medium of claim 17, wherein the method further comprises:
 collecting statistics associated with purchase transactions made at a merchant from the group of preferred merchants with the financial account;
 providing the statistics to the merchant; and
 requesting compensation for the purchases based on the statistics.

22. The non-transitory computer-readable medium of claim 17, wherein at least one of the first incentive and the second incentive is a tiered incentive.

23. The non-transitory computer-readable medium of claim 17, wherein the receiving the customer selection of the at least one merchant comprises:
 providing a list of merchants outside the group of preferred merchants to the customer; and
 receiving the selection of the merchant from the customer based on the provided list of merchants.

24. The non-transitory computer-readable medium of claim 23, wherein the list of merchants includes one or more merchants that have previously performed a purchase transaction with the financial account.

* * * * *